(12) United States Patent
Takikawa et al.

(10) Patent No.: US 7,673,381 B2
(45) Date of Patent: Mar. 9, 2010

(54) METHOD OF MANUFACTURING HEAD SUSPENSION

(75) Inventors: Kenichi Takikawa, Aikoh-gun (JP); Masao Hanya, Aikoh-gun (JP); Noriyuki Saito, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 416 days.

(21) Appl. No.: 11/429,799

(22) Filed: May 8, 2006

(65) Prior Publication Data

US 2006/0260118 A1   Nov. 23, 2006

(30) Foreign Application Priority Data

May 9, 2005   (JP)   ............... 2005-136557

(51) Int. Cl.
*G11B 5/127* (2006.01)
*H04R 31/00* (2006.01)

(52) U.S. Cl. ............. 29/603.03; 29/603.04; 29/603.06; 29/603.07; 360/240; 360/244.1; 360/244.5; 360/264.1; 360/266.1

(58) Field of Classification Search ............. 29/603.03, 29/603.04, 603.06; 360/240, 244.2, 244.5–244.8, 360/345.2, 266.1, 265.6, 264.1
See application file for complete search history.

(56) References Cited

U.S. PATENT DOCUMENTS 5,282,103 A * 1/1994 Hatch et al. ............... 360/245
5,870,252 A 2/1999 Hanrahan
6,104,572 A 8/2000 Williams et al.
6,154,344 A * 11/2000 Marek ............... 360/264.2
6,392,843 B1 5/2002 Murphy
6,728,072 B1 4/2004 Van Sloun et al.
6,765,759 B2 7/2004 Bhattacharya et al.
7,283,332 B2 10/2007 Weber
2001/0043443 A1 11/2001 Okamoto et al.
2006/0209465 A1 9/2006 Takikawa et al.
2006/0260119 A1 11/2006 Tada et al.

FOREIGN PATENT DOCUMENTS

| JP | 59-120325 | 7/1984 |
|---|---|---|
| JP | 59-202119 | 11/1984 |
| JP | 9-282624 | 10/1997 |
| JP | 2000-137967 | 5/2000 |
| JP | 2005-032393 | 2/2005 |

* cited by examiner

*Primary Examiner*—Paul D Kim
(74) *Attorney, Agent, or Firm*—Jordan and Hamburg LLP

(57) ABSTRACT

A method of manufacturing a head suspension includes forming a rigid part chain product where the rigid parts are provided continuously, including forming a plate-like framework for formation of the rigid part including formation margins for formation of the rails and forming a deformable part along a longitudinal curve of each formation margin and forming the rails by bending the formation margins to rise, forming a resilient member chain product where the resilient members are provided continuously, forming the flexures, forming the bases, and a stacking and coupling step stacking and coupling the rigid part chain product, the resilient member chain product, the bases, and the flexures, to form a stacked set, and cutting and separating respective head suspensions from the stacked set.

8 Claims, 19 Drawing Sheets

| PRESENCE/ABSENCE OF LIFT OFF | Static G lift off 506.1G/3gf | | Static G lift off 506.1G/3gf | |
|---|---|---|---|---|
| | Loadbeam B1:3.11kHz (Short Rail Loadbeam) | | Loadbeam B1:4.02kHz (Long Rail Loadbeam) | |
| | 0.4msec | 1msec | 0.4msec | 1msec |
| No lift off | 273G | 257G 292G | 273G 301G | 273G 302G |
| Lift off at Leading side | (296G) | → | (325G) | 327G |
| Lift off | 324G | 327G | 351G | 354G |

Suspension B1:3.6kHz

Suspension B1:3.1kHz

METHOD OF MANUFACTURING HEAD SUSPENSION

BACKGROUND OF THE INVENTION

1. Field of the Invention

The present invention relates to a method of manufacturing a head suspension for a hard disk drive (HDD) incorporated in an information or data processing apparatus such as a computer.

2. Description of Related Art

A head suspension of a hard disk drive includes a load beam, a head supported with the load beam, and a slider attached to the head. The head suspension has a shock property that determines a lift of the slider from the surface of a hard disk when a shock is applied. The shock property of the head suspension is dependent on the weight of the load beam.

For example, a first head suspension has a load beam having a thickness (t) of 51 µm, a length (1L) of 7 mm, and a gram load of 2.5 gf that is applied by the load beam to a head, and a second head suspension has a load beam having a thickness (t) of 30 µm, a length (1L) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

It is understood from these examples that, to improve the shock property of a head suspension, a load beam of the head suspension must be thin and short and must have a large gram load.

FIG. 19 is a plan view showing a head suspension 101 for a hard disk drive according to a related art. The head suspension 101 has a base plate 103, a load beam 105, and a flexure 107. The load beam 105 has a rigid part (stiff part) 109 and a resilient part (hinge) 111. Each side edge of the rigid part 109 is provided with a rail 113 that rises from the surface of the rigid part 109.

FIG. 20 is a sectional view partly showing a hard disk drive in which the head suspension of FIG. 19 is installed. A carriage 115 has arms 117. To one of the arms 117, the base plate 103 of the head suspension 101 is fixed by, for example, swaging.

The carriage 115 is turned around a spindle 119 by a positioning motor 118 such as a voice-coil motor. The carriage 115 is turned around the spindle 119, to move a head 121 of the head suspension 101 to a target track on a hard disk 123.

When the disks 123 are rotated at high speed, the head 121 slightly rises from the surface of the disk 123 against the gram load of the head suspension 101.

To improve the shock property of the head suspension 101, the length (1L) of the load beam 105 is shortened and thinned, thereby reducing the weight of the load beam 105.

In practice, the arm 117 vibrates. Accordingly, the load beam 105 must be designed in consideration of the first bending frequency of the arm 117, i.e., the resonant frequency of the arm 117 in a first bending mode. The first bending frequency is hereinafter referred to as the "B1 frequency." It is important to consider the B1 frequency of the arm 117 when determining a B1 frequency for the load beam 105.

FIGS. 21 to 23 are graphs showing a relationship between the B1 frequency and shock property of an arm installed in a 2.5-inch hard disk drive. Among the figures, FIG. 21 shows an acceleration representative of a shock applied to the hard disk drive at which a slider lifts, FIG. 22 shows a maximum acceleration occurring at a front end of the arm due to the applied shock, and FIG. 23 shows a maximum displacement of the arm due to the applied shock. In each of FIGS. 21 to 23, an abscissa indicates the B1 frequency of the arm. In each of FIGS. 21 and 22, an ordinate indicates an acceleration on the arm. In FIG. 23, an ordinate indicates a displacement of the arm. The magnitude of acceleration of the applied shock is 300 G in each case. Half-wavelength durations of the applied shock are 2 msec, 1 msec, and 0.4 msec.

It is understood in FIGS. 21 to 23 that the arm is substantially immovable against a shock of 2 msec or 1 msec duration if the B1 frequency of the arm is high (for example, 1.5 kHz) as indicated with curves 125A, 125B, 125C, 127A, 127B, and 127C. On the other hand, the arm differently acts against a shock of 0.4 msec duration, as indicated with curves 129A, 129B, and 129C.

This is because the arm conducts a large action with respect to a shock of 0.4 msec duration even if the B1 frequency of the arm is high.

A head suspension attached to such an arm must follow the arm action. If the load beam of a head suspension can follow the vibration of an arm, the slider of the head suspension will not lift from the surface of a disk.

Another consideration to be done for a head suspension is an off-track property. It is basically understood that the vertical rigidity (or stiffness) of a head suspension is irrelevant to the off-track property of the head suspension.

In practice, head suspensions involve a slight twist, and disks involve a slight inclination. Due to such twist and inclination, the vertical rigidity or B1 frequency of a head suspension influences the off-track property of the head suspension.

FIG. 24 is a graph showing the off-track property of a head suspension whose B1 frequency is 3.1 kHz. In FIG. 24, an abscissa indicates the frequency of an arm and an ordinate indicates off-track displacement. In the graph of FIG. 24, a curve depicted with a continuous line represents the off-track property of a head suspension measured on a 2.5-inch disk rotated at 5400 rpm and a curve depicted with a dotted line represents the off-track property of the head suspension measured on a 2.5-inch disk rotated at 7200 rpm.

In FIG. 24, the head suspension has a low B1 frequency of 3.1 kHz, and therefore, the bending mode of the head suspension overlaps the bending mode of the arm. As a result, an off-track phenomenon is observed at 3.0 kHz and at 3.3 kHz.

To avoid the off-track phenomenon, the B1 frequency of the load beam of the head suspension must be increased so that the bending mode of the head suspension will not overlap the bending mode of the arm.

To increase the B1 frequency of a load beam, continuously forming the rail 113 along each side edge of the rigid part 109 as shown in FIG. 19 is effective.

For a load beam having a configuration shown in FIG. 25, it is difficult to form a continuous rail along the whole length of a rigid part 109A.

FIG. 25 is a perspective view showing a head suspension. Parts of FIG. 25 corresponding to those of FIG. 19 are represented with the same reference numerals plus "A."

To improve the vertical rigidity (stiffness) of the load beam 105A, the head suspension 101A of FIG. 25 has rails 113A on the rigid part 109A of the load beam 105A. A base end of the rigid part 109A has a wide part 131. The wide part 131 has a trapezoidal shape that gradually widens toward a resilient part 131A. The wide part 131 has no rails.

The head suspension 101A of FIG. 25 is used for a 3.5-inch hard disk that has little demand for an improved shock property but has a more intense need for a high sway frequency. To achieve a higher sway frequency, the rigid part 109A is provided with the wide part 131. It is not strongly required for this head suspension to extend the rails 113A over the wide part 131.

A head suspension used for a 2.5-inch disk drive is required to have an improved shock property. The structure of FIG. 25 having no rails on the wide part 131 demonstrates a low B1 frequency for the load beam 105A, to hardly satisfy the required shock property.

To satisfy the required shock property, a structure shown in FIG. 26 may be devised from the structure of FIG. 25. FIG. 26 is a perspective view showing a head suspension 101B. Parts of FIG. 26 that correspond to those of FIG. 25 are represented with the same reference numerals plus "B" instead of "A."

The head suspension 101B of FIG. 26 continuously forms rails 113B from the front end of a rigid part 109B to the end of a wide part 131B. This configuration can improve the B1 frequency of a load beam 105B to satisfy a required shock property and improve a sway frequency.

Continuously forming the rails 113B from the front end of the rigid part 109B to the end of the wide part 131B involves a longitudinal curve 133 at an intermediate part of each rail 113B. When forming the rail 113B by bending the rigid part 109B including the wide part 131B, the rail 113B may be deformed at the longitudinal curve 133, to twist the rigid part 109B. The twist of the rigid part 109B deteriorates the off-track property of the head suspension 101B.

For the details of the above-mentioned related arts, U.S. Pat. No. 6,765,759B2 and Japanese Unexamined Patent Application Publication No. 09-282624 can be referred to.

SUMMARY OF THE INVENTION

An object of the present invention is to provide a method of manufacturing a head suspension, capable of smoothly forming a head suspension which has a load beam and rails formed on the load beam achieving a required shock property and solving the problem of a twist of the head suspension due to longitudinal curves of the rails.

In order to accomplish the object, the present invention most characterized by a rigid part framework forming step forming a plate-like framework for rigid part formation including formation margins for rail formation and forming a deformable part along a longitudinal curve of each formation margin and a rail forming step forming rails by bending the formation margins to rise.

An aspect of the present invention provides a method of manufacturing a head suspension that has a load beam and rails formed on a load beam. The method includes the rigid part framework forming step forming a plate-like framework for rigid part formation including formation margins for rail formation and forming a deformable parts along a longitudinal curve of each formation margin and a rail forming step forming rails by bending the formation margins to rise. Therefore, it can reliably provide the head suspension that has a load beam and rails formed on a load beam, achieving a required shock property and off-track property by solving a problem of a twist of the head suspension and improving a longitudinal rigidity of the load beam to raise the B1 frequency.

DETAILED DESCRIPTION OF EMBODIMENTS

Methods of manufacturing a head suspension according to embodiments of the present invention will be explained in detail. Each of the embodiments realize by simple steps to form a head suspension which satisfies a required shock property by providing the resilient part of the load beam with the rails and prevents a twist of the head suspension due to the presence of the longitudinal curves of the rails by providing the rails with the deformable parts.

First Embodiment

Figure 1:
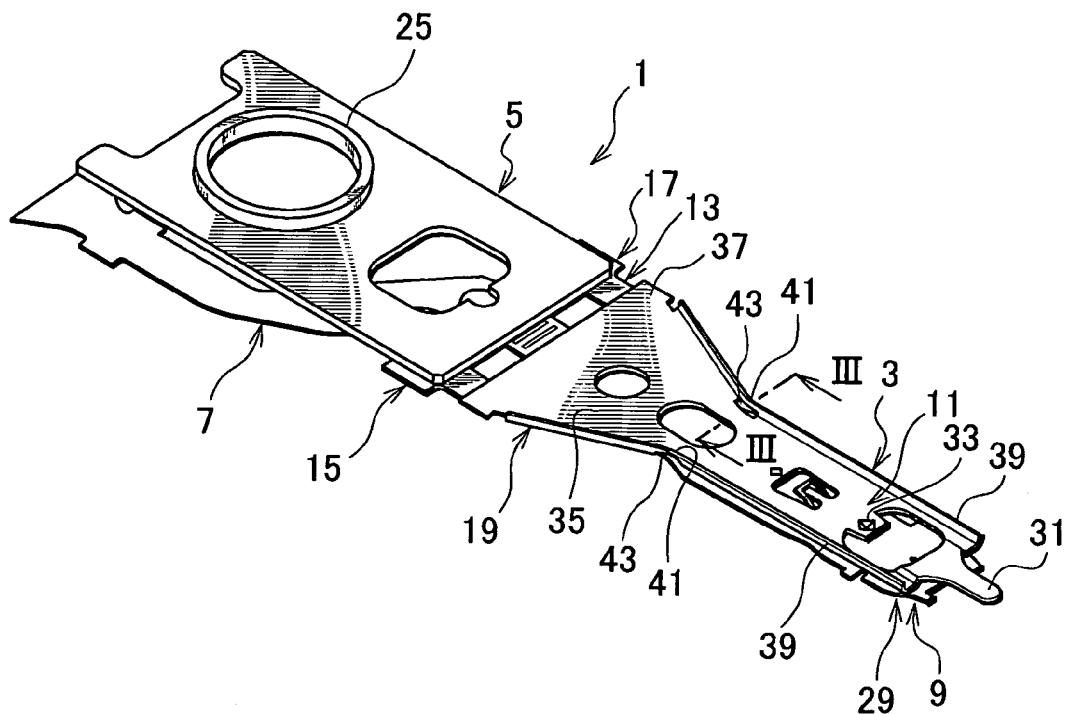
FIG. 1 is a perspective view showing an opposite-to-disk side of a head suspension according to a first embodiment of the present invention.
Figure 2:
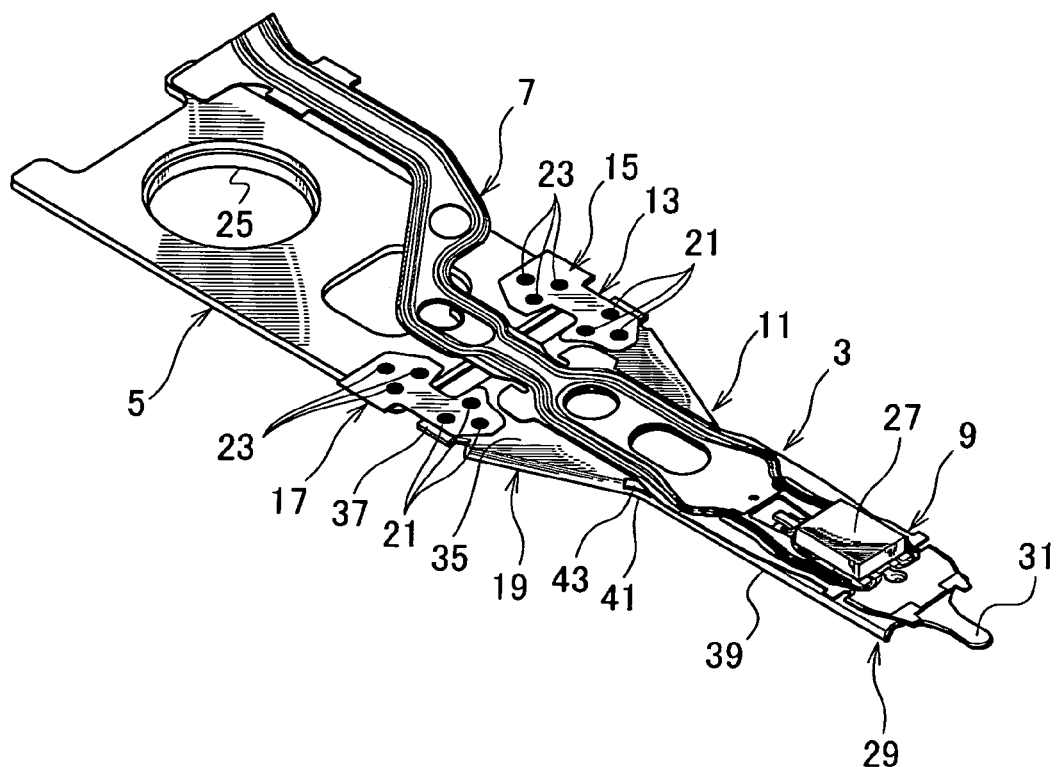
FIG. 2 is a perspective view showing a disk side of a head suspension of FIG. 1.
Figure 3A:
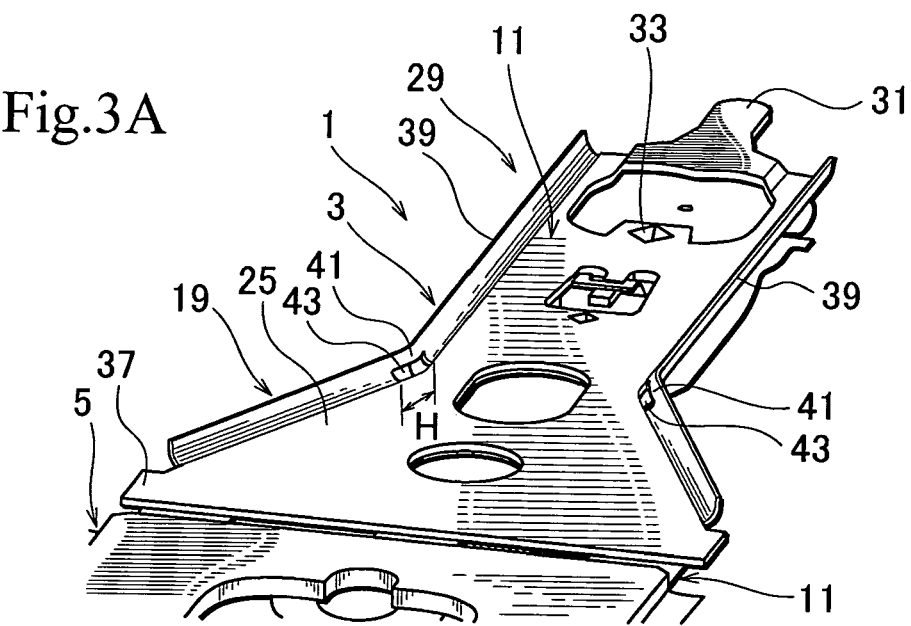
FIG. 3A is an enlarged perspective view partly showing the head suspension of FIG. 1.
Figure 3B:
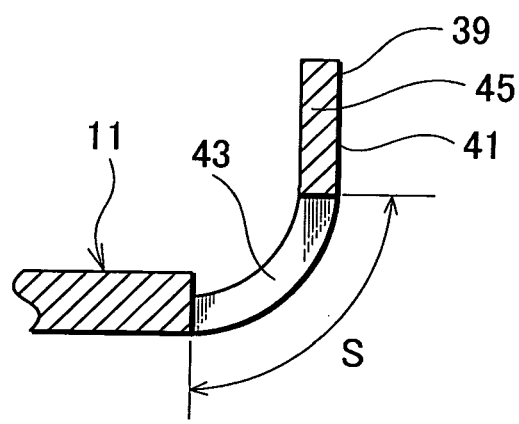
FIG. 3B is a sectional view taken along a line III-III of FIG. 1.
Figure 3C:
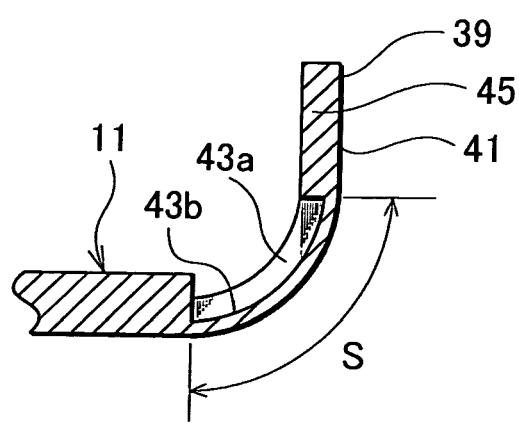
FIG. 3C is a sectional view showing a modification of the first embodiment, the part shown in FIG. 3C corresponding to the part shown in FIG. 3B.

A head suspension manufactured by a method of manufacturing according to a first embodiment of the present invention will be explained with reference to FIGS. 1 to 3 in which FIG. 1 is a perspective view showing an opposite-to-disk side of the head suspension, FIG. 2 is a perspective view showing a disk side of the head suspension, FIG. 3A is an enlarged perspective view partly showing the head suspension, FIG. 3B is a sectional view taken along a line III-III of FIG. 1, FIG. 3C is a sectional view showing a modification of the first embodiment. In this specification, the "disk" is a storage medium which is arranged in a hard disk drive and to and from which data is written and read through a head supported by the head suspension. The opposite-to-disk side is one side of the head suspension that is oriented opposite to the disk. On the other hand, disk side is other side of the head suspension facing the disk.

Shock property of the load beam is expressed with the magnitude of a shock at which the slider of the load beam is lifted from the surface of a disk. The phenomenon that a slider of a load beam lifts off from the surface of a disk in response to the application of a shock is referred to as "G-lift-off" or "lift off G." The "G-lift-off" or "lift off G" is also indicative of the magnitude of the shock that causes a lift-off of the slider.

The head suspension 1 shown in FIGS. 1 to 3 is used for a 2.5-inch disk, for example, and has a load beam (LB) 3, a base plate 5 corresponding to a base, and a flexure 7.

The load beam 3 applies load onto the head 9. The head 9 is arranged at a front end of the load beam 3, to write and read data to and from the disk. The load beam 3 includes a stiff part, flange, beam, or rigid part 11 and a hinge or resilient part 13. The rigid part 11 is made of, for example, stainless steel and has a thickness of, for example, about 38 μm.

The resilient part 13 is formed from a pair of resilient members 15 and 17 prepared separately from the rigid part 11. Each of the resilient members 15 and 17 is made of, for example, a thin resilient rolled stainless-steel plate. A first end of the resilient member is fixed to a base end 19 of the rigid part 11 by, for example, laser welding at welded spots 21, and a second end of the resilient member is fixed to the base plate 5 by, for example, laser welding at welded spots 23.

The base plate 5 has a boss 25. The boss 25 is attached by swaging to an arm of a carriage installed in a hard disk drive, so that the base plate 5 may turn around a spindle. The base plate 5 may be integral with an arm that is attached to the carriage.

The flexure 7 includes a conductive thin plate made of, for example, a resilient stainless-steel rolled plate (SST). On the thin plate, an insulating layer is formed. On the insulating layer, read/write wiring patterns are formed. The flexure 7 is fixed to the rigid part 11 by, for example, laser welding. One ends of the wiring patterns are electrically connected to write and read terminals supported on a slider 27 of the head 9. The other ends of the wiring patterns are extended along the base plate 5.

The rigid part 11 has a front end 29 that is narrow and has a predetermined width. The front end 29 is provided with a load/unload tab 31 and the vicinity of the front end 29 is provided with a dimple 33. The base end 19 of the rigid part 11 is provided with a wide part 35 that gradually widens or expands toward the resilient part 13. For example, the wide part 35 has a trapezoidal plan shape. An end of the wide part 35 is a joint 37 that is connected to the resilient part 13. At this joint 37, the rigid part 11 is joined to the resilient part 13.

A rail 39 is formed along each side edge of the rigid part 11 by bending the side edge so that the rail 39 rises in a thickness direction of the rigid part 11. The rail 39 continuously and entirely extends on the front end 29 of the rigid part 11 and on the wide part 35 of the base end 19 of the rigid part 11. The thickness of the rail 39 is thinner than that of the general thickness of the rigid part 11 adjacent to the rail 39 in a direction intersect with a rail extending direction (longitudinal direction).

The rail 39 includes a vertical curve S between the rigid part 11 and the rail 39. The vertical curve S is oriented in a rising direction of the rail 39. According to the first embodiment, the rail 39 and vertical curve S are entirely thinner than the rigid part 11 adjacent to the vertical curve S in a direction intersect with a rail extending direction. The thinner parts are formed by, for example, half-etching. Thinning the rail 39 including the vertical curve S enables the rail 39 to be formed even from the thick rigid part 11.

Each rail 39 has a longitudinal curve 41 at a portion corresponding to a portion of rigid part 11 between the front end 29 and the base end 19. The longitudinal curve 41 is spread across an area of rail 39 corresponding to an area of the rigid part 11 between back and front positions of where the width of the front end 29 starts to widen to form the wide part 35. At the longitudinal curve 41, the rail 39 has a rectangular window 43, i.e., a through hole serving as a deformable part. Namely, the deformable part is formed by partly removing at least a material of the rail 39.

As shown in FIGS. 3A and 3B, the longitudinal curve 41 extends for a longitudinal distance H. A vertical curve S is formed between the rigid part 11 and each rail 39 in a rising direction of the rail 39. The vertical curve S extends for a distance S in the rising direction of the rail 39. At the longitudinal curve 41, the window 43 spans substantially for the distances H and S. Namely, at the longitudinal curve 41, the rail 39 is partially cut by the window 43. According to the first embodiment, the rigid part 11 is also partially cut by the window 43. The window 43 may spread more than the distances H and S, or less than them. At the longitudinal curve 41, the rail 39 is continuous with a bridge 45.

With the window 43, the longitudinal curve 41 of the rail 39 is easily deformable in the longitudinal and rising directions of the rail 39 compared with the remaining part of the rail 39. When forming the rail 39 by bending the side edge of the rigid part 11, the window 43 releases or relaxes stress acting on the rigid part 11 and longitudinal curve 41.

The deformable part may be configured as shown in FIG. 3C. In FIG. 3C, the deformable part at the longitudinal curve 41 includes a recess 43a and a thin part 43b defined by the recess 43a. The area of the recess 43a and thin part 43b may be equal to that of the window 43. The thin part 43b may be located at an inner, outer, or intermediate position in the thickness direction of the vertical curve S.

In this way, thinning the rail 39, even if the rigid part 11 is formed in the thick head suspension 1, erect formation of the rail 39 can be performed naturally.

Figure 4:
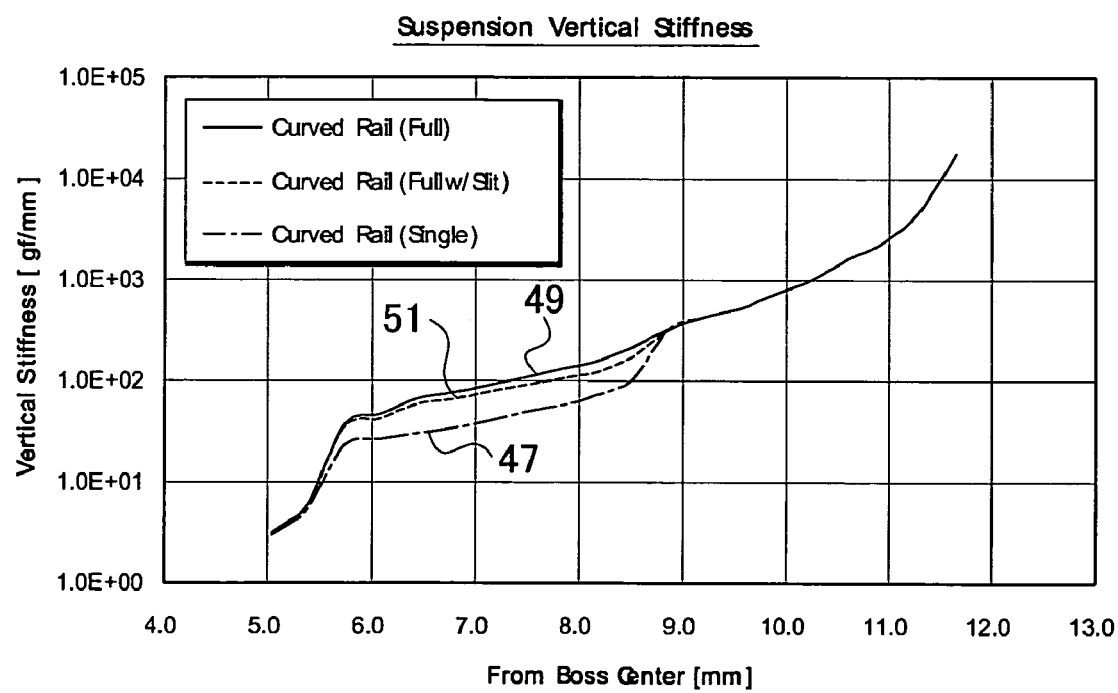
FIG. 4 is a graph showing a distribution of vertical rigidity (stiffness) of the head suspension of the first embodiment.

FIG. 4 is a graph showing a distribution of vertical rigidity (stiffness) of the head suspension 1. An abscissa indicates a distance from the center of the boss 12 and an ordinate indicates vertical rigidity.

Figure 25:
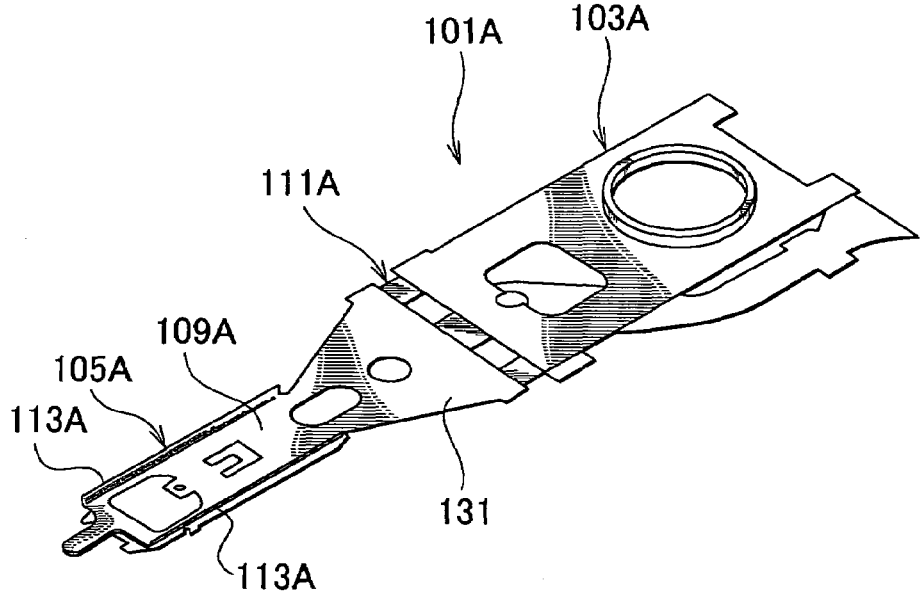
FIG. 25 is a perspective view showing a head suspension according to a related art.
Figure 26:
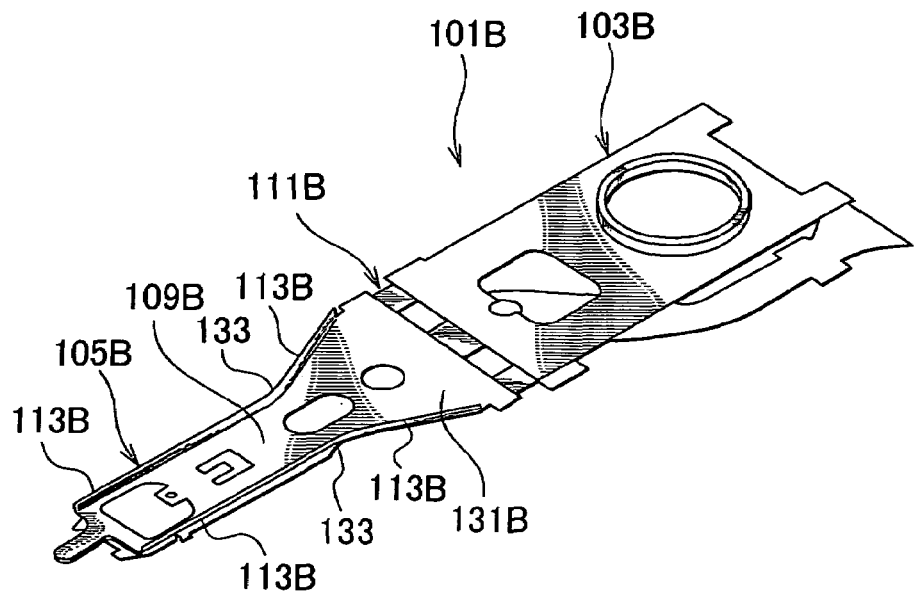
FIG. 26 is a perspective view showing a head suspension according to a related art.

In FIG. 4, a curve 47 represents the head suspension 101A of the related art shown in FIG. 25 having the rails 113A formed only along the front end of the rigid part 109A. A curve 49 represents the head suspension 101B of the related art shown in FIG. 26 having the rails 113B that continue along the front end and wide part 131B of the rigid part 109B without deformable parts on the rails 113B. A curve 51 represents the head suspension 1 according to the first embodiment of the present invention.

As is apparent in FIG. 4, the head suspension 101B (FIG. 26) having the rails extending along the front end and wide part 131B of the rigid part 109B and the head suspension 1 according to the first embodiment each demonstrate higher vertical rigidity than the head suspension 101A (FIG. 25) having the rails 113A only along the front end of the rigid part 109A. Compared with the head suspension 101B having no deformable parts on the rails 113B that are continuous along the front end and wide part 131B of the rigid part 109B, the head suspension 1 of the first embodiment having the windows 43 serving as deformable parts on the rails 39 demonstrates nearly the same vertical rigidity.

An analysis of characteristics or properties that are required for a load beam to follow the motion of an arm will be explained.

Figure 5A:
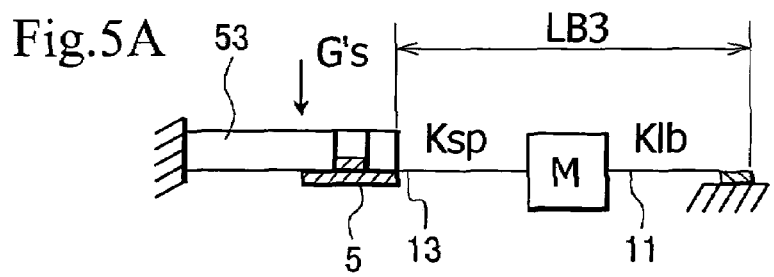
FIG. 5A is an analytic model showing a head suspension.
Figure 5B:
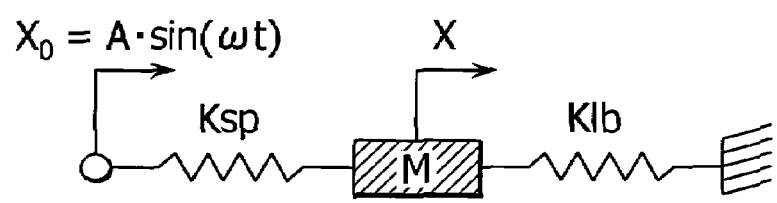
FIG. 5B is a vibration model based on the model of FIG. 5A.

FIG. 5A is an analytic model showing a head suspension and FIG. 5B is a vibration model based on the model of FIG. 5A. In FIGS. 5A and 5B, M is a mass of the load beam 3 assumed to be concentrated on the gravity center, Ksp is a spring constant of the load beam 3 on a resilient part 13 side from the gravity center, including the resilient part 13 that is supported with an arm 53, Klb is a spring constant due to the rigidity of a rigid part 11 from the gravity center to a dimple, G's is a shock input, X0 is an arm action, and X is a displacement of the load beam 3 at the gravity center.

The displacement X is expressed as follows:

$$X = A / \{(Klb/Ksp) - (\omega/\omega 0)^2 + \omega 0^2\} \quad (1)$$

$$\omega 0^2 = Ksp/M$$

Figure 6:
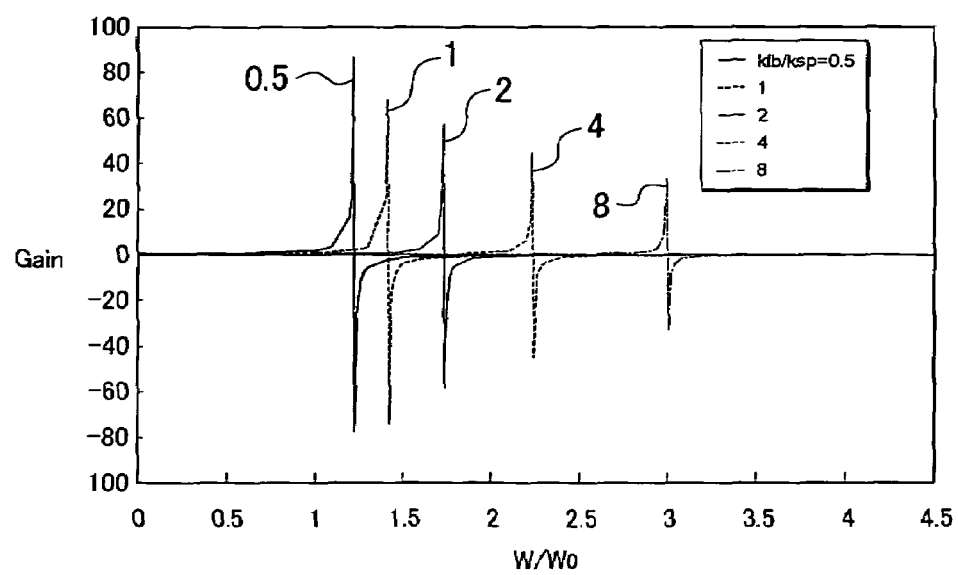
FIG. 6 is a graph showing a relationship between an increase in "Klb/Ksp" and a gain based on the models of FIGS. 5A and 5B.

Reducing the displacement X results in suppressing a lift of a slider from a disk. For this, the expression (1) indicates that (Klb/Ksp) and $\omega 0^2$ must be increased. FIG. 6 is a graph showing a relationship between an increase in (Klb/Ksp) and a gain. When (Klb/Ksp) is increased as 0.5, 1, 2, 4, and 8 as shown in FIG. 6, the frequency increases and the gain decreases.

To increase (Klb/Ksp), Klb must be increased because Ksp is restricted by the resilient part 13. Namely, the vertical stiffness (rigidity) of the load beam must be improved. To increase $\omega 0^2$, M must be reduced.

In consequence, to reduce the displacement X, the vertical stiffness of the load beam must be improved and the mass M must be reduced.

Figures 7, 8:
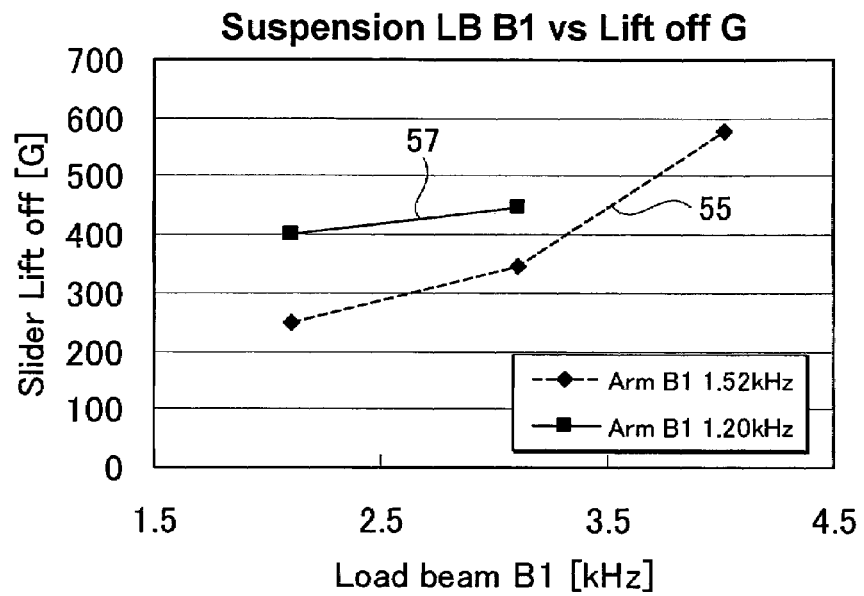
FIG. 7 is a graph showing a relationship among the B1 frequency of an arm, the B1 frequency of a load beam, and the lift-off of a slider.
FIG. 8 is a list showing a relationship among the lift-off of a slider, the magnitude of a shock applied, and the B1 frequency of a head suspension that supports the slider in connection with a 2.5-inch hard disk drive.

FIG. 7 is a graph showing a relationship among the B1 frequency of an arm, the B1 frequency of a load beam, and the lift-off of a slider. An abscissa represents the B1 frequency of a load beam and an ordinate represents the acceleration of a shock at which a slider of the load beam lifts. A curve 55 is for an arm having a B1 frequency of 1.52 kHz and a curve 57 is for an arm having a B1 frequency of 1.20 kHz.

As is apparent in FIG. 7, a load beam having a low B1 frequency is unable to follow the arm having the high B1 frequency, demonstrates an inferior shock property, and causes the slider thereof to lift at a low acceleration. A load beam having a B1 frequency of 4 kHz can sufficiently follow the arm having the high B1 frequency of 1.52 kHz, demonstrates a superior shock property, and realizes a high acceleration level at which the slider thereof lifts.

Data shown in FIG. 7 relates to assemblies each consisting of only a carriage arm and a head suspension. In practice, situations surrounding the head suspension are more complicated because many conditions such as the behavior of a head suspension base and the operation mode of a disk are involved. FIG. 8 shows data sampled from head suspensions in more practical situations.

FIG. 8 is a list showing a relationship among the lift-off of a slider, the magnitude of a shock applied, and the B1 frequency of a head suspension that supports the slider. The data shown in FIG. 8 relates to a 2.5-inch hard disk drive. When the B1 frequency of a load beam is increased from 3.11 kHz to 4.02 kHz as shown in FIG. 8, the level of a shock of 0.4 msec duration at which the slider of the load beam lifts increases from 296 G to 325 G. In this way, increasing the B1 frequency of a load beam is effective to suppress a lift-off of the slider of the load beam.

Figure 9:
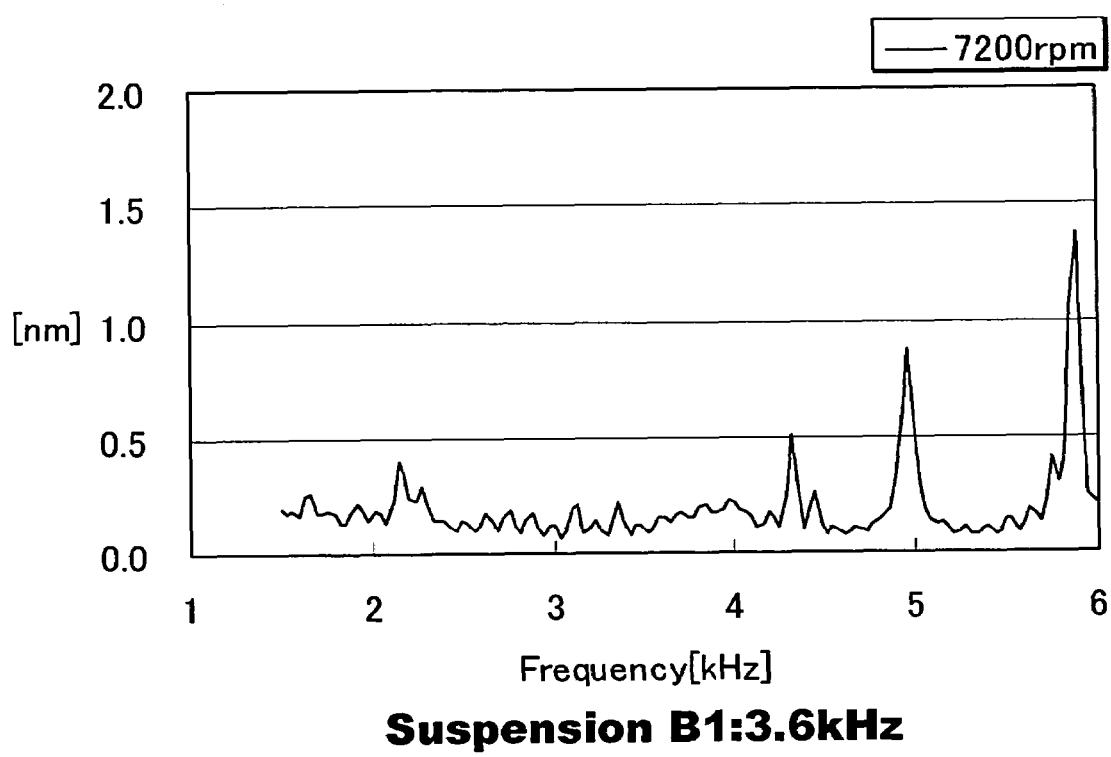
FIG. 9 is a graph showing the off-track property of a head suspension, including an arm, which has a total B1 frequency of 3.6 kHz.

FIG. 9 is a graph showing the off-track property of a head suspension having a total B1 frequency of 3.6 kHz. An abscissa represents frequencies and an ordinate represents off-track amount. The data shown in FIG. 9 relates to a 2.5-inch hard disk rotating at 7200 rpm.

Figure 21:
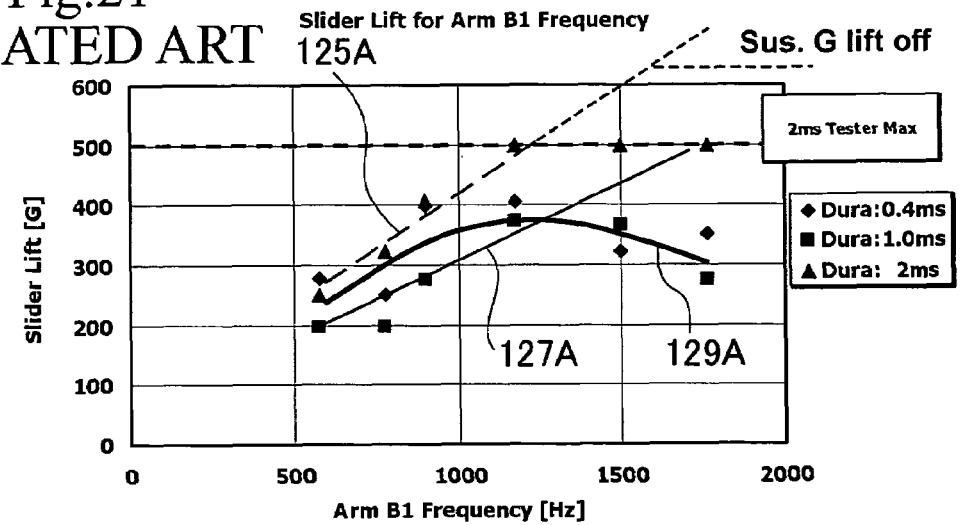
FIGS. 21 to 23 are graphs showing relationships between the B1 frequency of an arm and the action of the arm in a 2.5-inch disk drive according to a related art.
Figure 22:
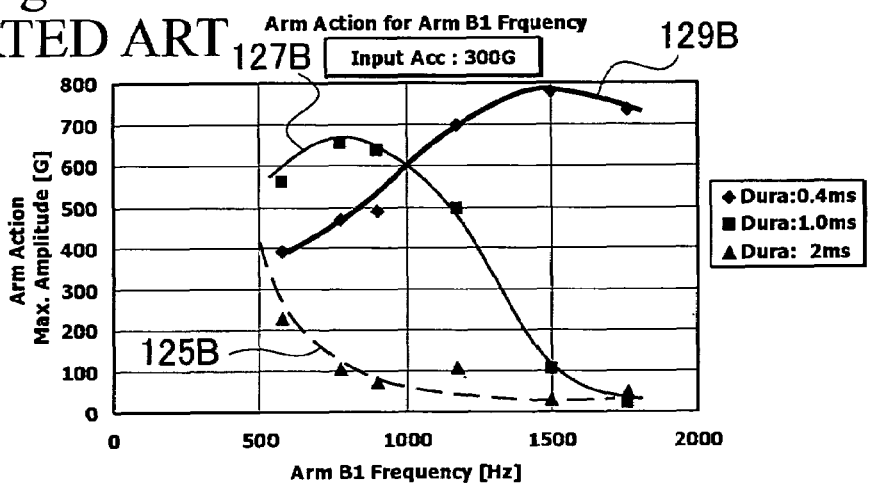
Figure 23:
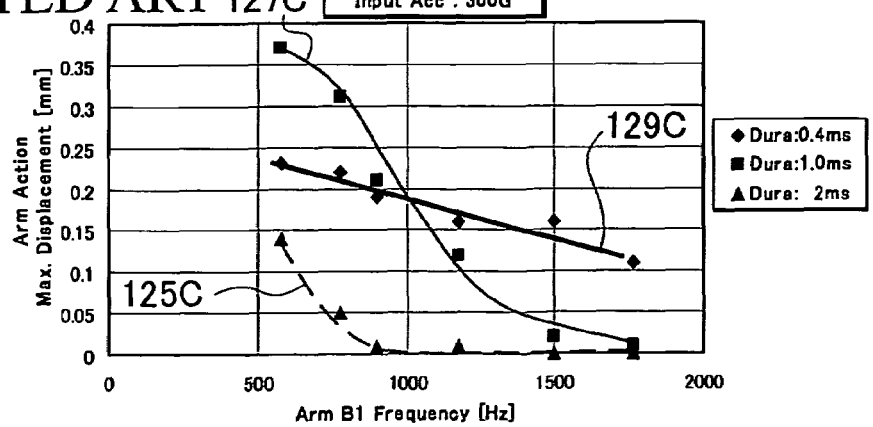
Figure 24:
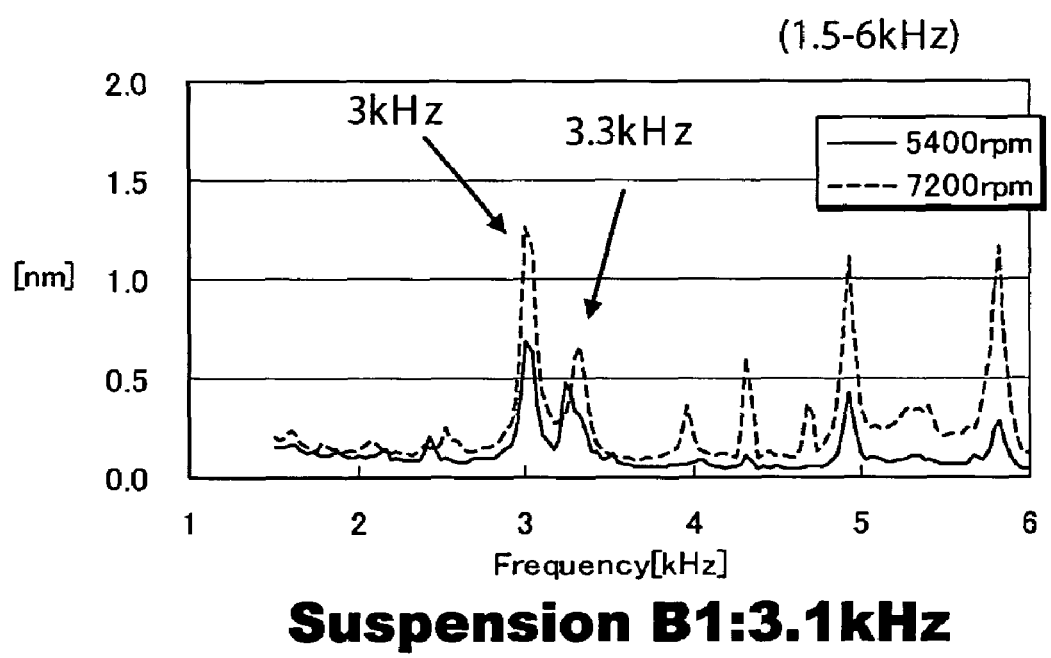
FIG. 24 is a graph showing the off-track property of a head suspension having a total B1 frequency of 3.1 kHz according to a related art.

As explained with reference to FIG. 21, a head suspension having a low B1 frequency overlaps the bending mode of the head suspension on the bending mode of an arm, to cause an off-track error.

The first embodiment improves the vertical stiffness (rigidity) of the load beam 3, to increase the B1 frequency of the head suspension 1. This results in eliminating the overlapping of the bending modes of the head suspension 1 and an arm and reducing a bending amplitude. It is apparent from comparison between the first embodiment of FIG. 9 and the related art of FIG. 21 that the first embodiment causes no off-track error related to the bending mode of the head suspension 1.

As explained above, the head suspension according to the first embodiment of the present invention has the window 43 at the longitudinal curve 41 of each rail 39. The window 43 prevents a distortion of the rigid part 11 and rail 39 when forming the rail 39 by bending a side edge of the rigid part 11. The rails 39 can improve the vertical rigidity of the load beam 3, increase the B1 frequency of the load beam 3, and satisfy a shock property required for the head suspension 1. The wide part 35 of the rigid part 11 can increase a sway frequency. The wide part 35 has the rails 39 that are continuous from the front end 29 of the rigid part 11, to further increase the sway frequency.

The window 43 covers the longitudinal distance H and vertical distance S of the longitudinal curve 41 of each rail 39. With the window 43, the longitudinal curve 41 of the rail 39 is easily deformable in the longitudinal and rising directions of the rail 39 compared with the remaining part of the rail 39. When forming the rail 39 by bending a side edge of the rigid part 11, the window 43 releases or relaxes stress acting on the rigid part 11 and longitudinal curve 41. This configuration prevents a distortion of the rigid part 11 at the longitudinal curve 41 when forming the rail 39 by bending a side edge of the rigid part 11, suppresses a torsion of the head suspension 1, and eliminates an off-track error.

A method of manufacturing of the head suspension 1 will be explained with reference to FIGS. 10 to 13.

Figure 10:
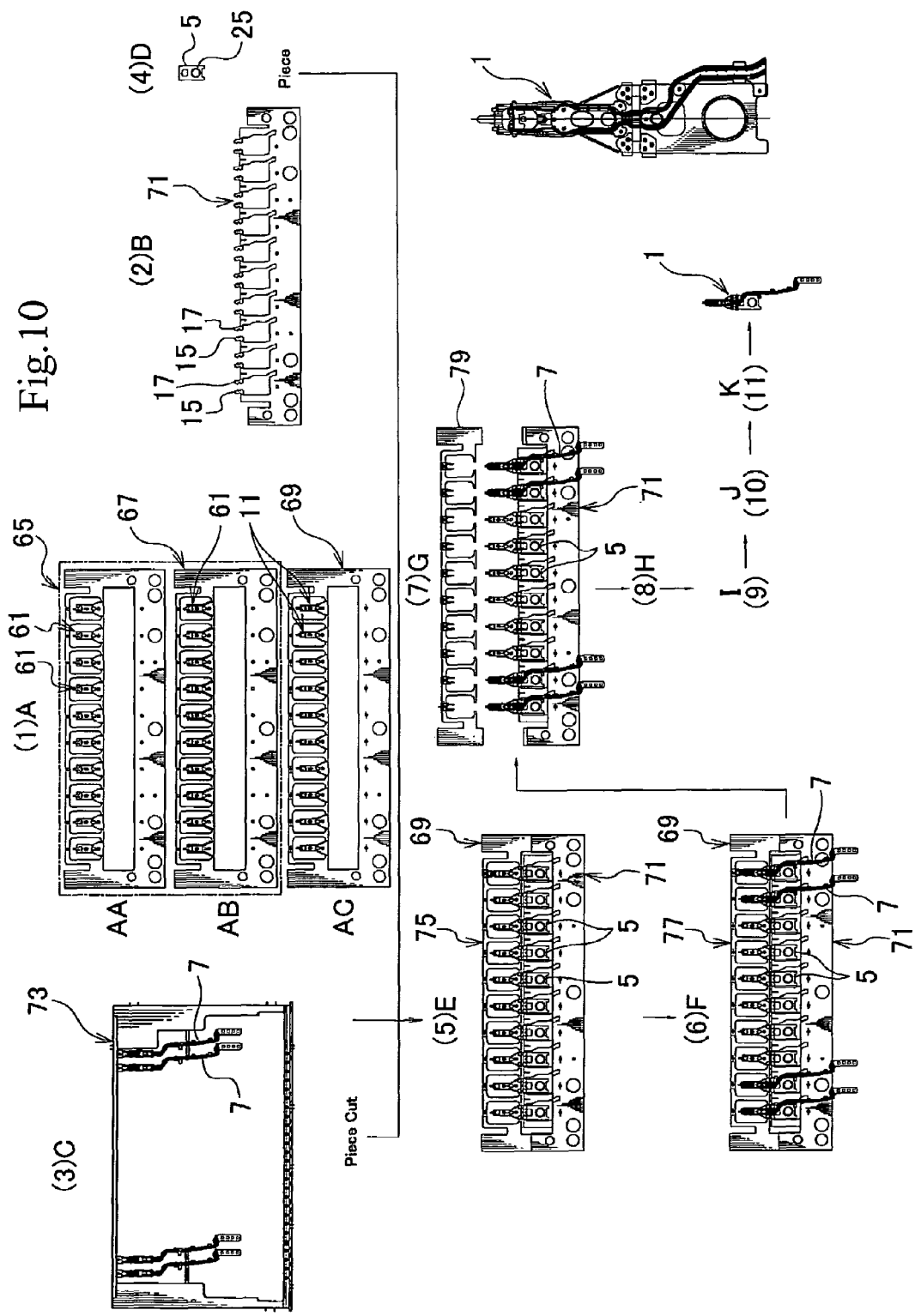
FIG. 10 is a plan view corresponding to manufacturing steps for realizing a method of manufacturing a head suspension according to the first embodiment of the present invention.
Figure 11:
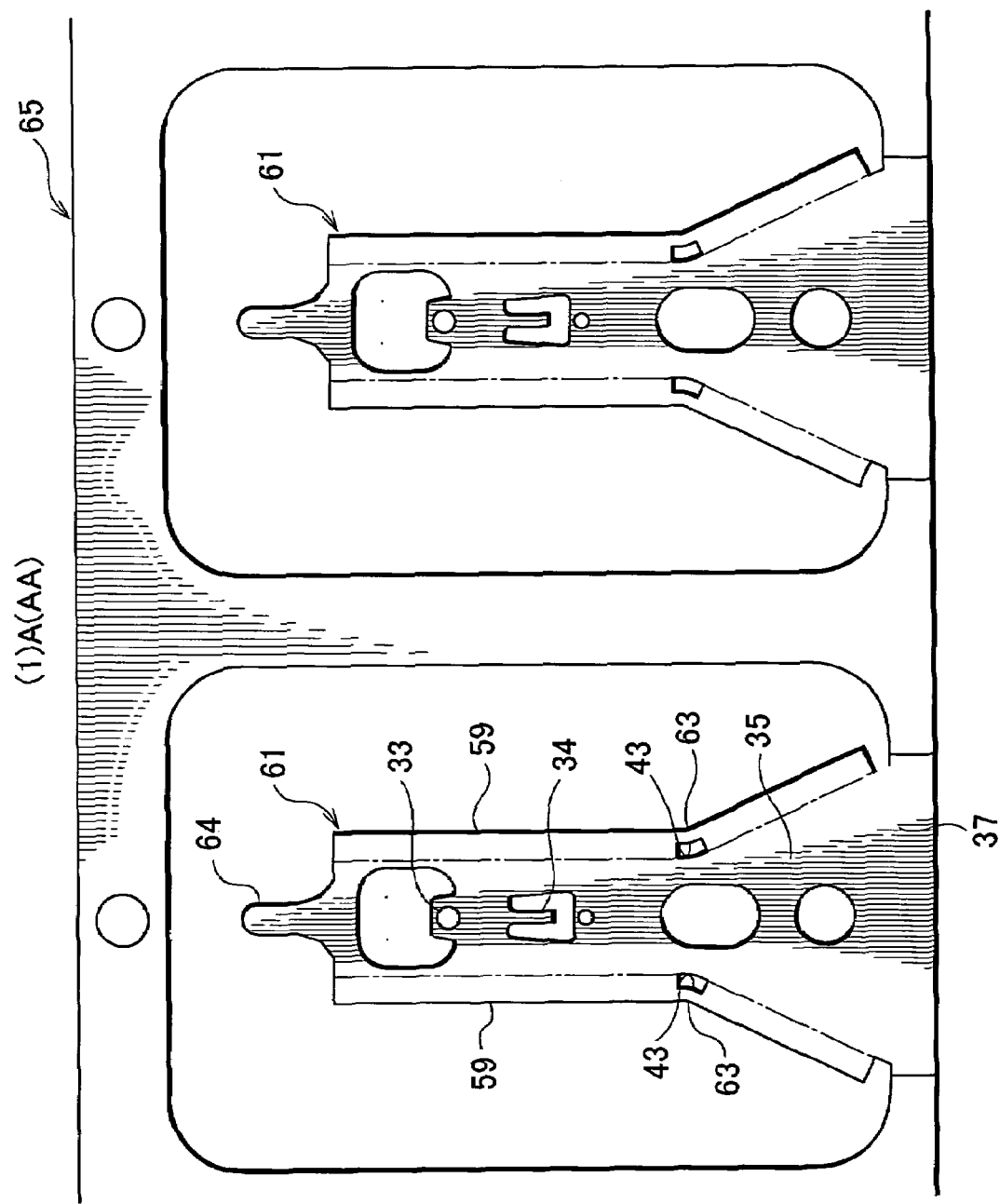
FIG. 11 is an enlarged plan view partly showing a chain product obtained after a rigid part framework forming step according to the first embodiment of the present invention.

FIG. 10 is a plan view corresponding to manufacturing steps for realizing a method of manufacturing a head suspension according to the first embodiment of the present invention. FIG. 11 is an enlarged view partly showing a chain product after a rigid part framework forming step, FIG. 12 is an enlarged view partly showing the chain product after an etching step, and FIG. 13 is an enlarged view partly showing the chain product after a rail forming step.

In FIG. 10, a part (1) corresponds to a rigid part chain product manufacturing step A, which includes a rigid part framework forming step AA, an etching step AB, and a rail forming step AC.

In FIGS. 10 and 11, in the rigid part framework forming step AA in the rigid part chain product manufacturing step A, a flat plate-like framework 61 for formation of a rigid part 11 is formed. The framework 61 includes formation margins 59 for formation of rails 39 and windows 43 (or a recess 43a and a thin part 43b) formed as deformable parts along longitudinal curves 63 of the formation margins 59. Simultaneously, a dimple 33, a limiter or stopper 34, a wide part 35, a joint 37, a tab framework part 64 for forming the tab 31, and the like are formed on the framework 61 to obtain a chain product 65.

Figure 12:
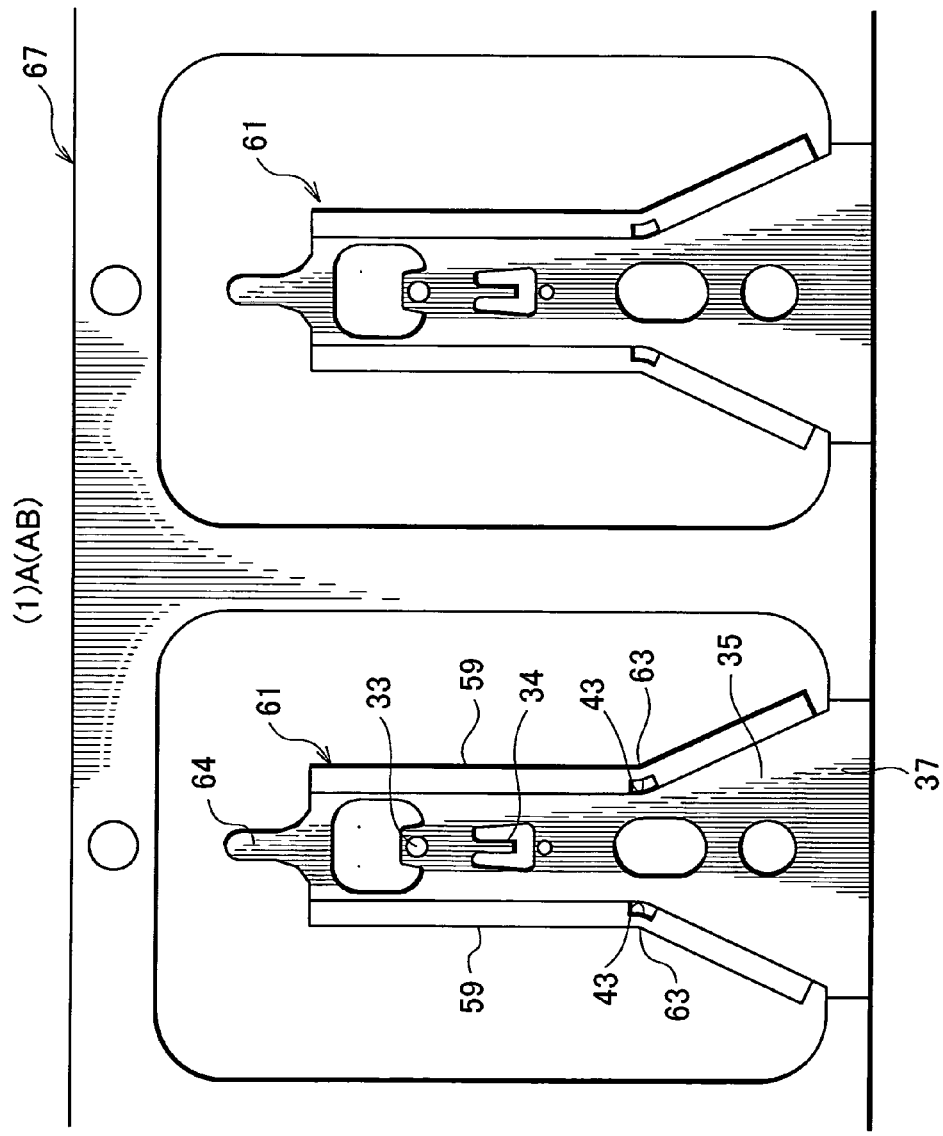
FIG. 12 is an enlarged plan view partly showing the chain product after an etching step of the method according to the first embodiment of the present invention.
Figure 13:
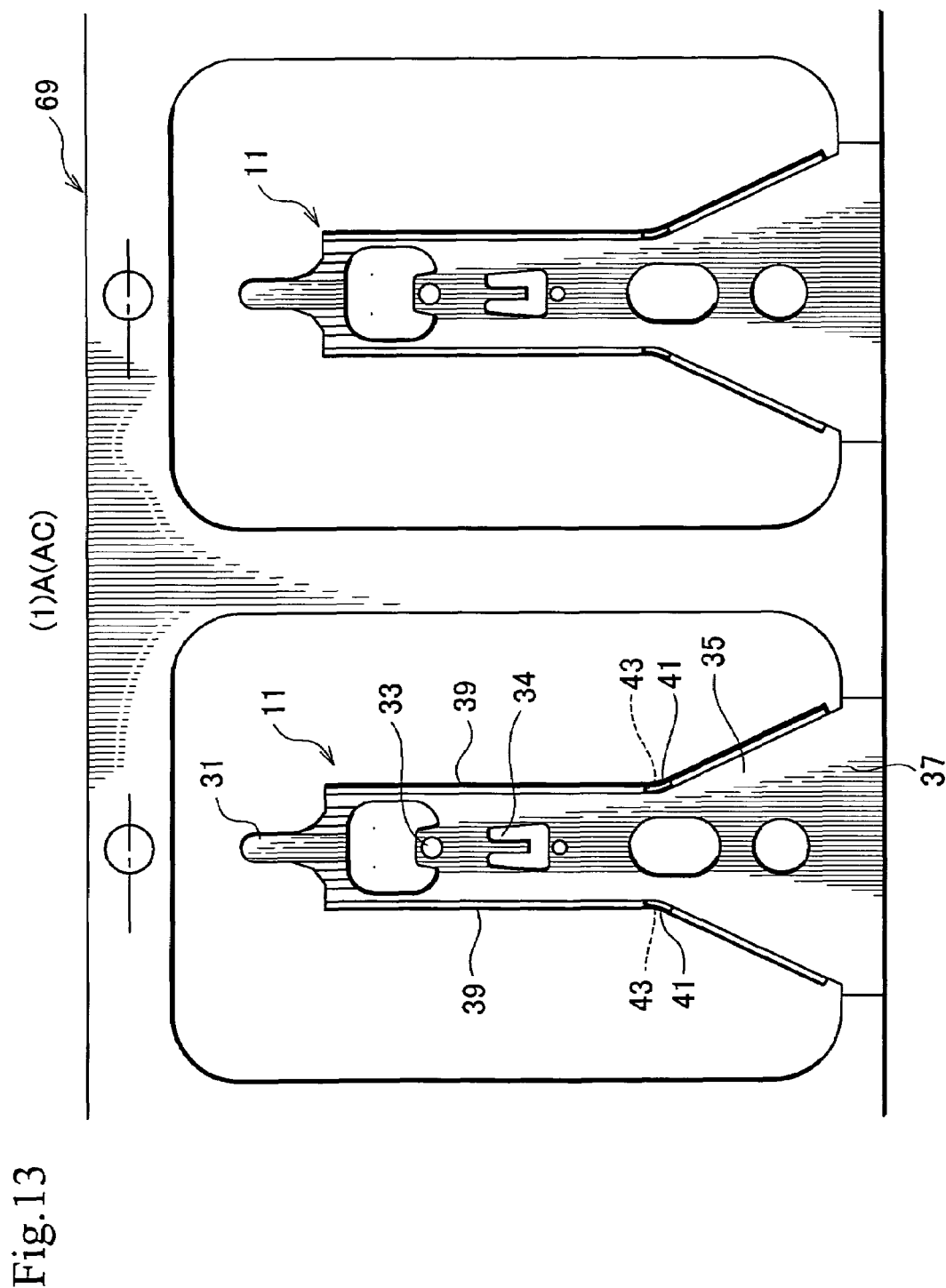
FIG. 13 is an enlarged plan view partly showing the chain product after a rail forming step of the method according to the first embodiment of the present invention.

In FIGS. 10 and 12, in the etching step AB after the rigid part framework forming step AA, the formation margins 59 are entirely thinned by performing partial etching to be thinner than the rigid part 11, to form a chain product 67.

In FIGS. 10 and 13, in the rail forming step AC after the etching step AB, the rails 39 are formed by raising the formation margins 59 through pressing or the like. At the same time, a tab 31 is formed by pressing a tab framework part 64. Thereby, a rigid part chain product 69 where rigid parts 11 are continuously provided side by side is formed.

In FIG. 10, a part (2) corresponds to a resilient member chain product manufacturing step B included in the resilient member manufacturing step. In the step B, a resilient member chain product 71 where resilient members 15 and 17 constituting resilient parts 13 are continuously provided is formed.

In FIG. 10, a part (3) corresponds to a flexure manufacturing step C. In the step C, a flexure chain product 73 where flexures 7 are continuously provided side by side is formed. Cutting of a thin plate, formation of wiring patterns, formation of a limiter, formation of an outrigger and the like are performed to each flexure 7 in the flexure chain product 73.

In FIG. 10, a part (4) corresponds to a base manufacturing step D, where the base plates 5 are formed by the required number as bases. The boss 25 is formed on the base plate 5 by, for example, pressing.

In FIG. 10, parts (5) and (6) correspond to stacking and coupling steps E and F, where a semi-stacking and welding step E and a stacking and welding step F are provided.

In the semi-stacking and welding step E, a semi-stacking set 75 is formed by, for example, laser welding proper spots of the stated rigid part chain product 69, resilient member chain product 71, and base plates 5.

In the stacking and welding step F, flexures 7 are respectively cut from the flexure chain product 73, respective flexures 7 are stacked at predetermined positions on the semi-stacked set 75. Positioning of respective flexures 7 to the semi-stacked set 75 are performed via positioning tabs. Each flexure 7 is laser welded to the semi-stacked set 75 to form a stacked set 77.

In FIG. 10, in a first cutting step G shown as a part (7), a frame 79 coupled to rigid parts 11 is cut from a stacked set 77. At the same time, positioning tabs of the flexures 7 are cut. A part (8) corresponds to a washing step H, where a semi-product after the first cutting step G is washed. A part (9) corresponds to a short check step I, where electrical check is performed. A part (10) corresponds to a GL step J, where measures a bending load and prevents permanent set in fatigue due to application of overload. A part (11) corresponds to a second cutting step K, where cuts finally individual head suspensions 1 from the stated set 77. The second cutting step K and the first cutting step G constitute a cutting step cutting and separating respective head suspensions 1 from the stacked set 77.

According to such manufacturing steps, head suspensions 1 can be formed and provided smoothly and reliably.

In addition, the rails 39 are extended from the front end 29 of the rigid part 11 to the wide part 35 of the base end 19, so that it can prevent the rigid part 11 from twisting due to residual stress.

The recess 43a and the thin part 43b shown in FIG. 3C can be formed by half-etching or pressing in the rigid part chain product manufacturing step A or the like.

Modifications of the head suspension of the first embodiment will be explained with reference to FIGS. 14 and 15.

FIGS. 14A to 15B are enlarged sectional views partly showing modifications of the first embodiment. The parts shown in FIGS. 14A and 14B correspond to those shown in FIGS. 3B and 3C, respectively. The parts shown in FIGS. 15A and 15B correspond to those shown in FIGS. 3B and 3C, respectively. Parts of FIGS. 14A to 15B that are the same as or correspond to those of FIGS. 3A to 3C are represented with the same reference numerals or same reference numerals plus "A", "B", or "C".

Figure 14A:
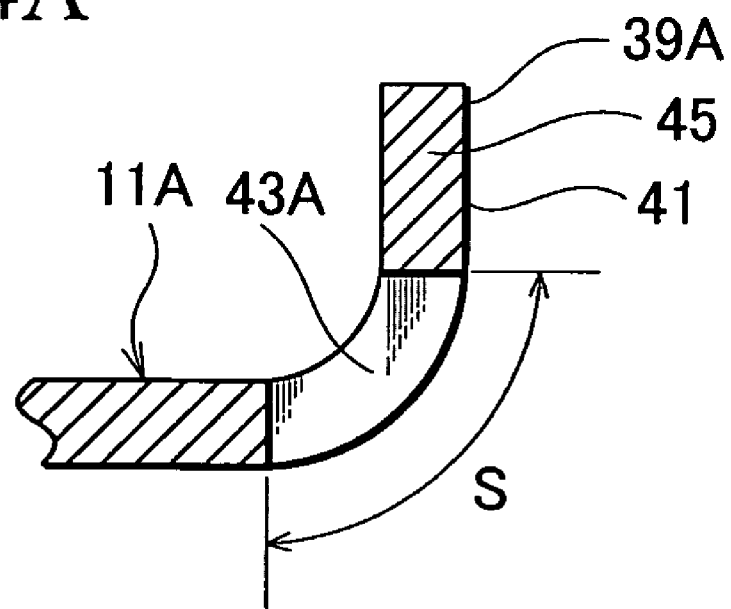
FIG. 14A is an enlarged sectional view partly showing a modification of the first embodiment, the part shown in FIG. 14A corresponding to the part shown in FIG. 3B.
Figure 14B:
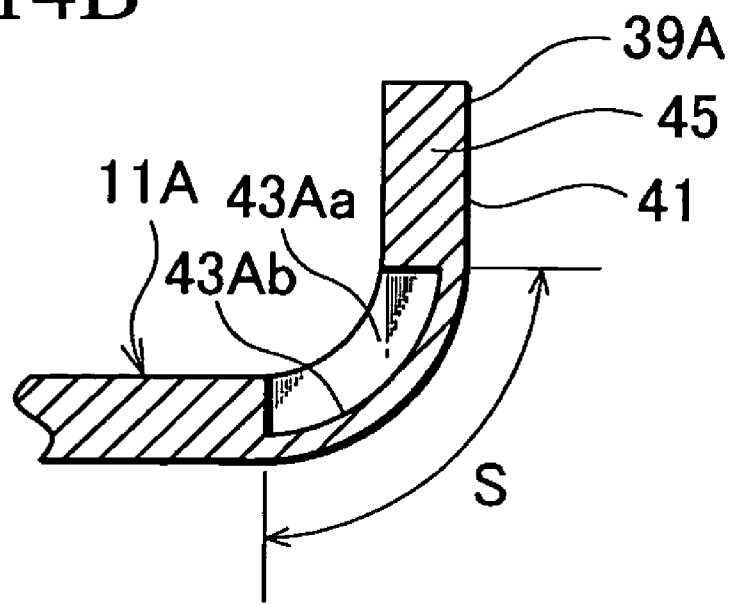
FIG. 14B is an enlarged sectional view partly showing a modification of the first embodiment, the part shown in FIG. 14B corresponding to part shown in FIG. 3C.

According to modifications of FIGS. 14A and 14B, the head suspension has a thin rigid part 11A which is thinner than the rigid part 11 of the first embodiment. A rail 39A is formed along each side edge of the rigid part 11A by bending the side edge so that the rail 39A rises in a thickness direction of the rigid part 11A. The thickness of the rail 39A is the same as the general thickness of the rigid part 11A adjacent to the rail 39A in a direction intersect with a rail extending direction. The rail 39A has a deformable part.

The deformable part of FIG. 14A is a rectangular window 43A, i.e., a through hole serving as a deformable part. The deformable part of FIG. 14B comprise a recess 43Aa and a thin part 43Ab defined by the recess 43Aa.

The window 43A of FIG. 14A can be formed in the same manner as the window 43, and the recess 43Aa and the thin part 43Ab can be formed in the rigid part chain product manufacturing step A by half-etching, pressing or the like.

Accordingly, raising the rails 39A can be performed naturally like the above.

Figure 15A:
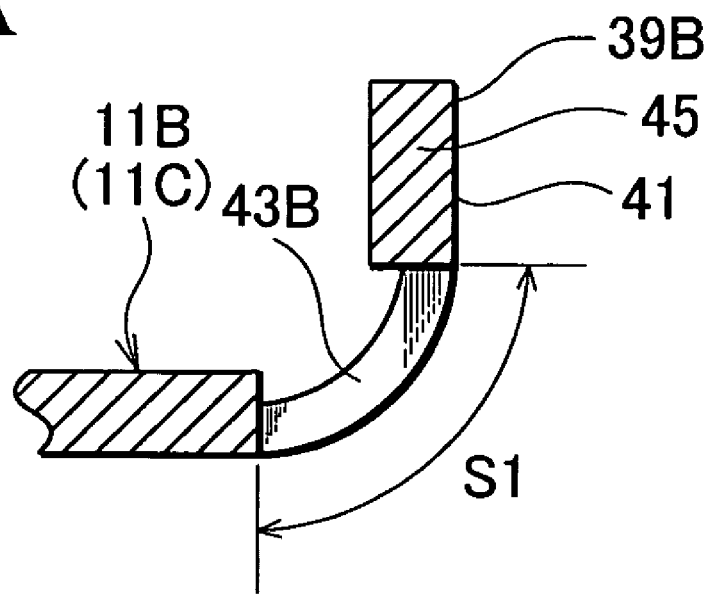
FIG. 15A is an enlarged sectional view partly showing a modification of the first embodiment, the part shown in FIG. 15A corresponding to the part shown in FIG. 3B.
Figure 15B:
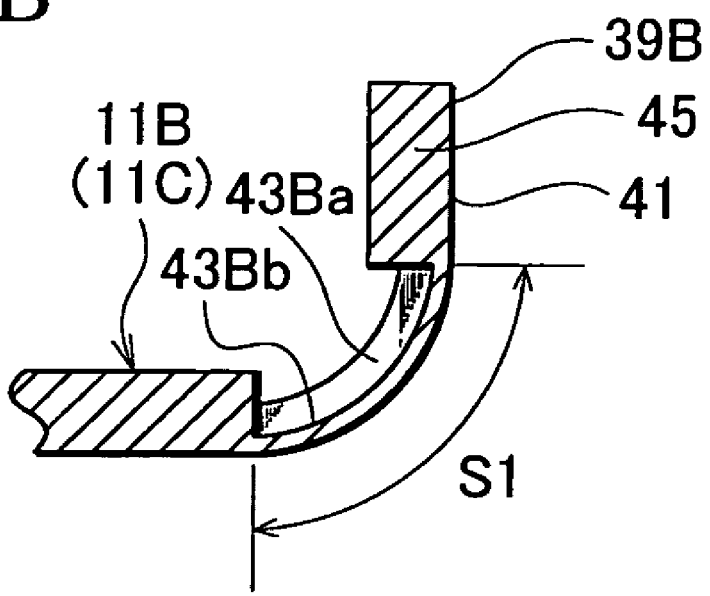
FIG. 15B is an enlarged sectional view partly showing a modification of the first embodiment, the part shown in FIG. 15B corresponding to part shown in FIG. 3C.

According to modifications of FIGS. 15A and 15B, the head suspension has a thick rigid part 11B which is thicker than the rigid part 11A of FIGS. 14A and 14B. The rigid part 11B has a thickness of about 51 µm. A rail 39B is formed along each side edge of the rigid part 11B by bending the side edge so that the rail 39B rises in a thickness direction of the rigid part 11B. The thickness of the rail 39B is the same as the general thickness of the rigid part 11B adjacent to the rail 39B in a direction intersect with a rail extending direction. A vertical curve S1 is formed between the rigid part 11 and each rail 39B in a rising direction of the rail 39B by, for example, half-etching. The vertical curve S1 is thinner than the rigid part 11B or the rail 39B. The rail 39A has a deformable part.

The deformable part of FIG. 15A is a rectangular window 43B, i.e., a through hole serving as a deformable part. The deformable part of FIG. 15B comprise a recess 43Ba and a thin part 43Bb defined by the recess 43Ba.

The window 43B can be formed in the same manner as the window 43, and the recess 43Ba and the thin part 43Bb can be formed in the rigid part chain product manufacturing step A by half-etching, pressing or the like.

By thinning the curved portion S1, raising formation of the rail 39B can be performed naturally even to a head suspension with a thick rigid part 11C which is thicker than the rigid part 11B.

Second Embodiment

A second embodiment of the present invention will be explained with reference to FIGS. 16 to 18. First, a structure of the head suspension will be explained.

Figure 16:
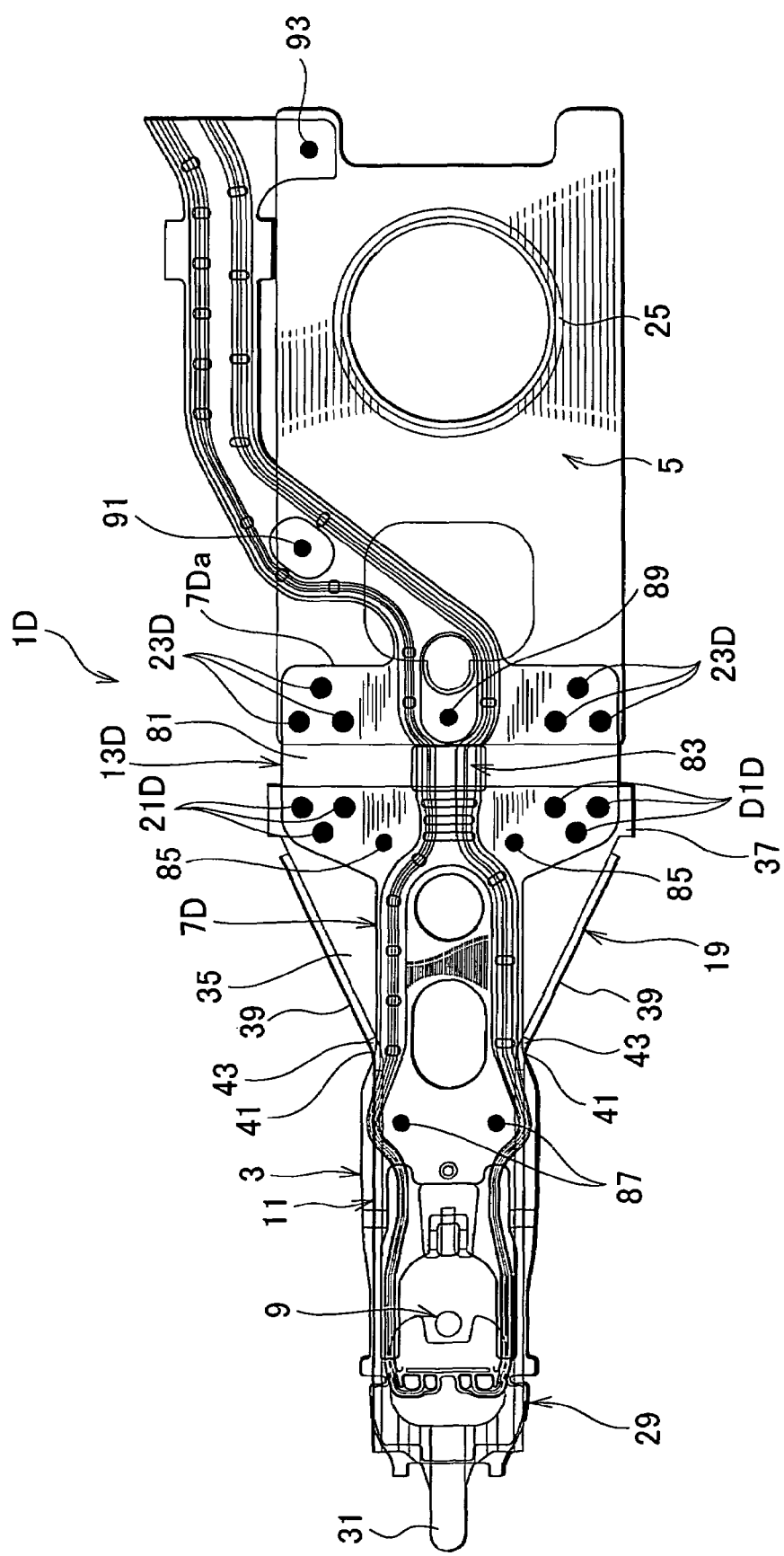
FIG. 16 is a transparent plan view showing a head suspension according to a second embodiment of the present invention.

FIG. 16 is a transparent plan view showing a head suspension according to a second embodiment of the present invention. The structure of the second embodiment is basically the same as that of the first embodiment, and therefore, the same or corresponding parts are represented with the same reference numerals or the same reference numerals plus "D."

According to the second embodiment, a head suspension 1D has a load beam 3, a base plate 5, and a flexure 7D. The flexure 7D has a thin plate 7Da made of, for example, a resilient thin stainless steel rolled plate (SST) having a spring or hinge property. On the thin plate 7Da, read/write wiring patterns 83 including conductors and insulating layer are formed.

A resilient part 13D is formed integrally with the thin plate 7Da of the flexure 7D. The resilient part 13D comprises both sides defined by a hole 81 formed in the thin plate 7Da. The hole 81 is formed so as to extend in a across-the-width direction beneath the wiring patterns 83.

The flexure 7D is welded to a joint 37 of the rigid part 11 at welded spots 21D on a front portion of the resilient part 13D and to the base plate 5 at welded spots 23D on a back portion of the resilient part 13D, respectively. The flexure 7D is further welded to the rigid part 11 at welded spots 85 and 87 and to the base plate 5 at welded spots 89, 91, and 93.

According to the head suspension 1D, operations, effects, and advantages similar to those in the head suspension 1 of the first embodiment can be achieved owing to presence of the window 43D. Since the resilient part 13D is formed integrally with the flexure 7D, the number of parts can be reduced and assembling and part management can be made considerably easy.

Next, a method of manufacturing the head suspension will be explained.

Figure 17:
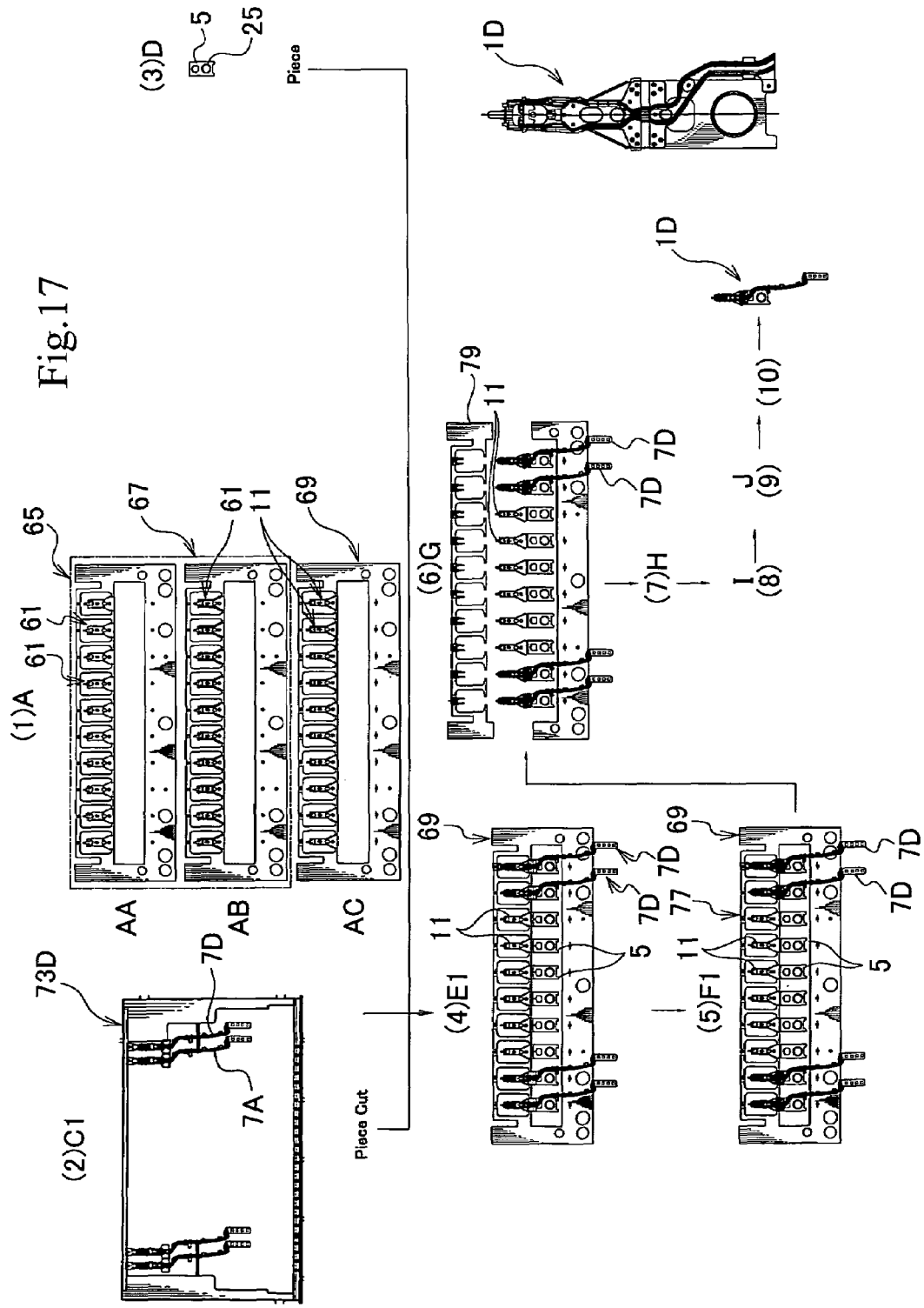
FIG. 17 is a plan view corresponding to manufacturing steps for realizing a method of manufacturing a head suspension according to the second embodiment of the present invention.

FIG. 17 is a schematic manufacturing step diagram for realizing a method of manufacturing a head suspension according to the second embodiment of the present invention. FIG. 18 is a plan view of a flexure. The manufacturing steps in this embodiment are basically similar to those shown in FIG. 10, and corresponding constituent portions are attached with same reference numerals or same reference numerals with "A" subsequent thereto for explanation.

In the manufacturing method of this embodiment, the resilient part 13D is formed from a part of the flexure 7D, so that a step corresponding to the resilient member chain product manufacturing step B shown in FIG. 10 is omitted. The manufacturing method of the second embodiment includes the rigid part chain product manufacturing step A shown as a part (1), a flexure manufacturing step C1 shown as a part (2), the base manufacturing step D shown as a part (3), a stacking and coupling step including the stacking step E1 shown as a part (4) and the welding step F1 shown as a part (5), the first cutting step G shown as a part (6), the washing step H shown as a part (7), the short check step I shown as a part (8), the GL step J shown as a part (9), and the second cutting step K shown as a part (10).

Figure 18:
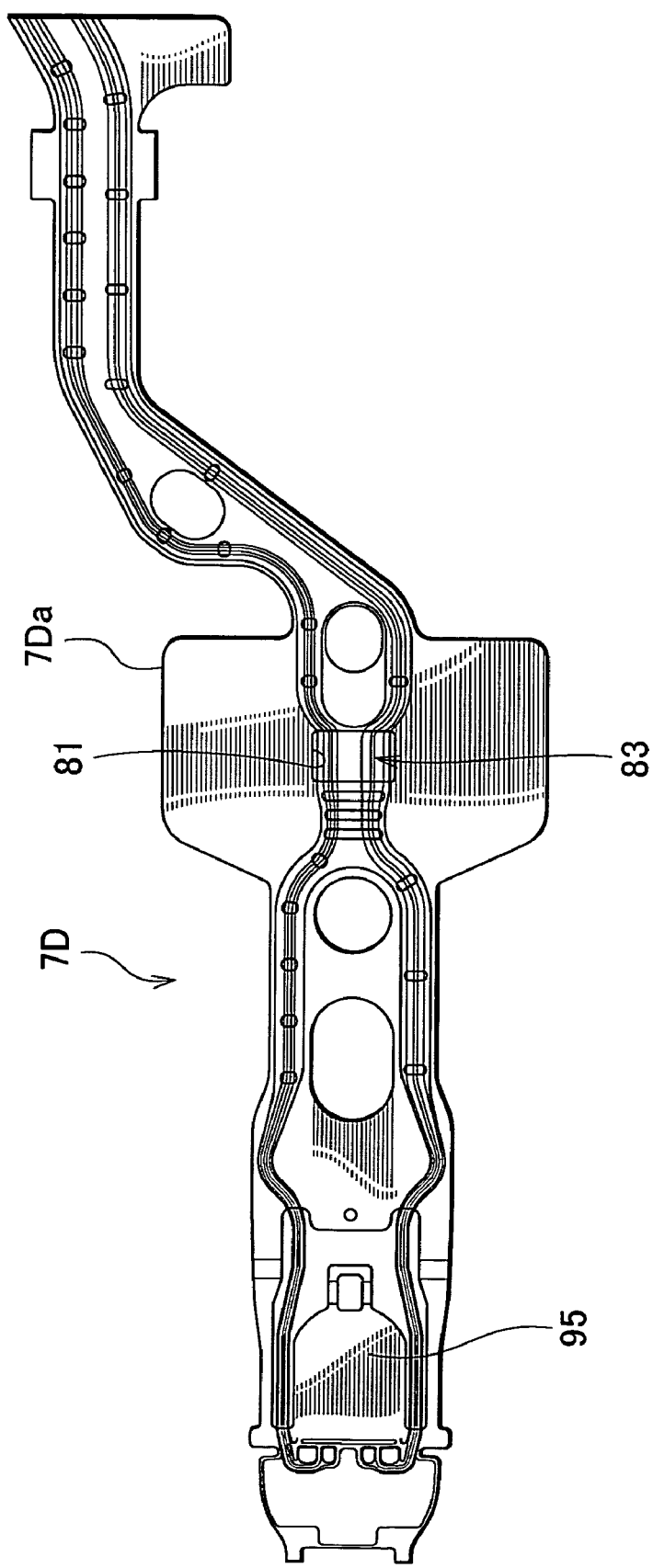
FIG. 18 is a plan view showing a flexure of FIG. 17.
Figure 19:
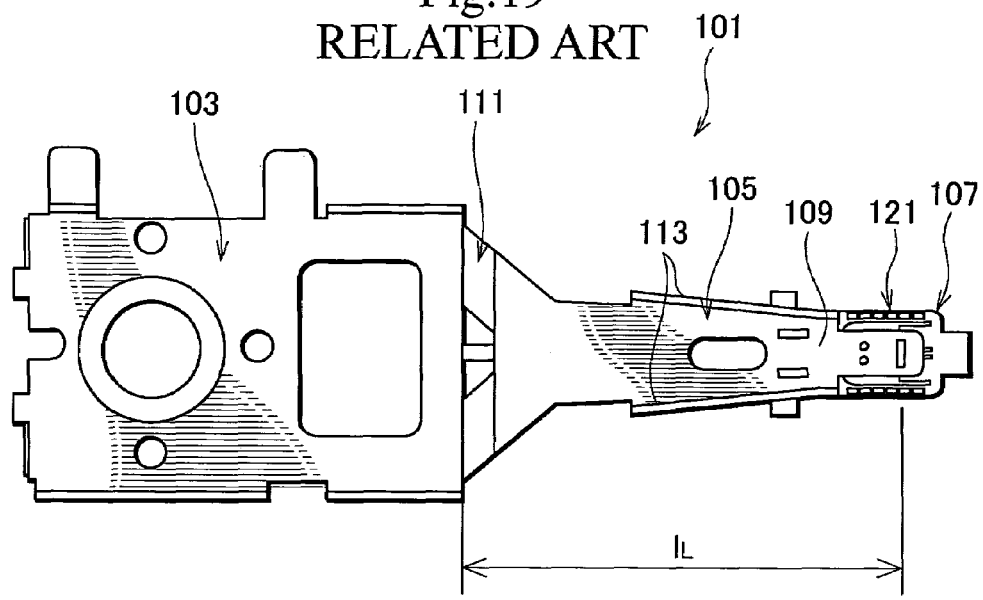
FIG. 19 is a plan view showing a head suspension according to a related art.
Figure 20:
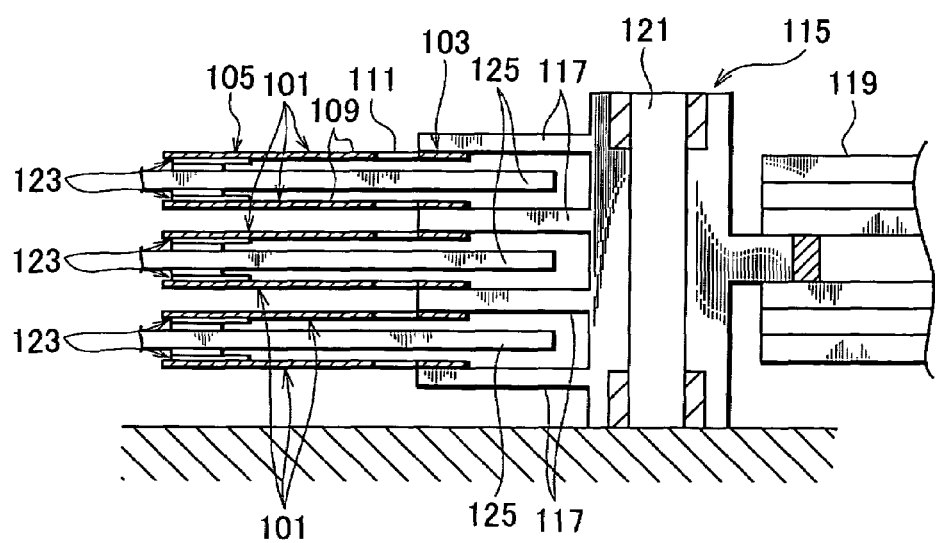
FIG. 20 is a partly sectioned view showing a hard disk drive in which the head suspension of the related art of FIG. 20 is installed.

In the embodiment, especially, a hole 81, a tongue 95, and the like are formed in the thin plate 7Da of flexure 7D in the flexure manufacturing step C1, as shown in FIGS. 17 and 18, and a wiring pattern 83 is provided on the thin plate 7Da. Thus, a flexure chain product 73D where flexures 7D are continuously provided side by side is formed in the flexure manufacturing step C1.

In the stacking step E1, the rigid part chain product 69, respective base plates 5, and respective flexures 7D are stacked and positioned. The flexures 7D are respectively cut from the flexure chain product 73D like the above.

In the welding step F1, a stacked set 77 is formed by, for example, laser welding respective parts after the stacking step E1.

The remaining steps in this embodiment are substantially similar to those in the first embodiment.

Accordingly, operations, effects, or advantages similar to that in the first embodiment can also be achieved in this embodiment.

In the embodiment, since the resilient member chain product manufacturing step B can be omitted, manufacture of a head suspension can be made simpler. Further, it is also possible to simplify the cutting step.

What is claimed is:

1. A method of manufacturing a head suspension that comprises a base to be attached to a carriage of a hard disk drive and turned around a spindle of the carriage, a load beam including a rigid part and a resilient part non-integral to the rigid part and configured to apply load onto a head that is arranged at a front end of the load beam in write and read data to and from a disk arranged in the hard disk drive, and a flexure attached to the load beam, supporting the head, and having read/write wiring patterns connected to the head, the method including:

forming a flat plate framework for formation of the rigid part wherein the rigid part in finished form includes:
a base end portion, to which the resilient part is to be attached, and a front end portion extending from the base end portion and having the front end of the load beam at a distal end thereof;
said front end portion having a front end flat portion with front end side edges opposed in a widthwise direction of the rigid part and extending substantially longitudinally from said front end toward said base end portion;
said base end portion having a width which increases with increasing distance from a junction of said base end portion and said front end portion such that said base end portion has a base end flat portion with base end side edges that define a greater angle of inclination with respect to a center-line of said rigid part than said front end side edges; and
said front end side edges being connected to said base end side edges by inflection curved edges at said junction;
said forming of said flat plate framework including providing a rigid part flat portion corresponding to said front end flat portion and said base end flat portion and defining a flat portion plane in which lay said inflection curved edges, and providing rail formation margins extending flat outward in said flat portion plane from said base end side edges, said front end side edges, and said inflection curved edges, and portions of said rail formation margins extending outward from said inflection curved edges forming longitudinally curved rail formation margins, said rail formation margins being configured to be formed into rails; and forming deformable parts in said longitudinally curved rail formation margins at positions adjacent each of said inflection curved edges, said deformable parts being rendered deformable by weakening said longitudinally curved rail formation margins adjacent said inflection curved edges in comparison to other portions of said rail formation margins; and forming the rails by bending the formation margins to form bent portions rising out of said flat portion plane and deform said deformable parts into curved rail portions.

2. The method of manufacturing a head suspension of claim 1, wherein said weakening forms a through hole or a recess cach deformable part.

3. The method of manufacturing a head suspension of claim 2, wherein the weakening includes etching at least a portion of said longitudinally curved rail formation margins thinner than a thickness of the rigid part flat portion by utilizing partial etching between the providing said rigid part flat portion and said forming the rails.

4. The method of manufacturing a head suspension of claim 1, wherein the weakening includes etching at least a portion of said longitudinally curved rail formation margins thinner than a thickness of the rigid part flat portion by utilizing partial etching between the providing said rigid part flat portion and said forming the rails.

5. A method of manufacturing a plurality of head suspensions that each comprise a base to be attached to a carriage of a hard disk drive and turned around a spindle of the carriage, a load beam including a rigid part and a resilient part non-integral to the rigid part and configured to apply load onto a head that is arranged at a front end of the load beam to write and read data to and from a disk arranged in the hard disk drive, and a flexure attached to the load beam, supporting the head, and having read/write wiring patterns connected to the head, the method including:

forming a rigid part chain product formed of plate material including a plurality of interconnected flat plate frameworks each for formation of the rigid part of one of said suspensions wherein the rigid part in finished form includes:

a base end portion, to which the resilient part is to be attached, and a front end portion extending from the base end portion and having the front end of the load beam at a distal end thereof;

said front end portion having front end flat portion with front end side edges opposed in a widthwise direction or the rigid part and extending substantially longitudinally from said front end toward said base end portion;

said base end portion having a width which increases with increasing distance from a junction of said base end portion and said front end portion such that said base end portion has a base end flat portion with base end side edges that define a greater angle of inclination with respect to a center-line of said rigid part than said front end side edges; and said front end side edges being connected to said base end side edges by inflection curved edges at said junction;

said forming of said rigid part chain product including simultaneously forming interconnected each of said rigid parts by simultaneously performing the following on said interconnected flat plate frameworks for each of the rigid parts:

providing a rigid part flat portion corresponding to said front end flat portion and said base end flat portion and defining a flat portion plane in which lay said inflection curved edges, and providing rail formation margins extending flat outward in said flat portion plane from said base end side edges, said front end side edges, and said inflection curved edges, and portions of said rail formation margins extending outward from said inflection curved edges forming longitudinally curved rail formation margins, said rail formation margins being configured to be formed into rails; and forming deformable in said longitudinally curved rail formation margins at positions adjacent each of said inflection curved edges, said deformable parts being rendered deformable by weakening said longitudinally curved rail formation margins adjacent said inflection curved edges in comparison to other portions of said rail formation margins; and forming the rails by ending the formation margins to form bent portions rising out of said flat portion plane and deform said deformable parts into curved rail portions;

forming a resilient member chain product including a plurality of the resilient members that are interconnected;

forming the flexures;

forming the bases;

stacking and coupling the rigid art chain product, the resilient member chain product, the bases, and the flexures, to form a stacked set; and cutting and separating respective head suspensions from the stacked set.

6. The method of manufacturing a head suspension of claim 5, wherein said weakening forms a through hole or a recess each deformable part.

7. The method of manufacturing a head suspension of claim 6, wherein the weakening includes etching at least a portion of said longitudinally curved rail formation margins thinner than a thickness of the rigid part flat portion by utilizing partial etching between the providing said rigid part flat portion and said forming the rails.

8. The method of manufacturing a head suspension of claim 5, wherein the weakening includes etching at least a portion of said longitudinally curved rail formation margins thinner than a thickness of the rigid part flat portion by utilizing partial etching between the providing said rigid part flat portion and said forming the rails.

* * * * *